US011893603B1

(12) United States Patent
Hart et al.

(10) Patent No.: US 11,893,603 B1
(45) Date of Patent: Feb. 6, 2024

(54) INTERACTIVE, PERSONALIZED ADVERTISING (71) Applicant: Rawles LLC, Wilmington, DE (US)

(72) Inventors: Gregory Michael Hart, Mercer Island, WA (US); Ian W. Freed, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 271 days.

(21) Appl. No.: 13/925,362

(22) Filed: Jun. 24, 2013

(51) Int. Cl.
G06Q 30/00 (2023.01)
G06Q 30/0251 (2023.01)

(52) U.S. Cl.
CPC .............. G06Q 30/0251 (2013.01)

(58) Field of Classification Search
CPC ................... G06Q 30/0207–30/0277
USPC .............................. 705/14.1–14.73
See application file for complete search history.

(56) References Cited

U.S. PATENT DOCUMENTS

| 7,418,392 | B1 | 8/2008 | Mozer et al. | |
| 7,720,683 | B1 | 5/2010 | Vermeulen et al. | |
| 7,774,204 | B2 | 8/2010 | Mozer et al. | |
| 8,745,650 | B1* | 6/2014 | Bachman | H04H 20/10 725/110 |
| 9,774,905 | B2* | 9/2017 | Kim | H04L 12/2834 |
| 10,034,135 | B1* | 7/2018 | Provost | H04W 12/033 |
| 2002/0022999 | A1* | 2/2002 | Shuster | G06Q 30/0255 705/14.69 |
| 2002/0077130 | A1* | 6/2002 | Owensby | H04M 3/4878 455/456.3 |
| 2006/0041478 | A1* | 2/2006 | Zheng | G06Q 30/0269 705/14.66 |
| 2006/0167747 | A1* | 7/2006 | Goodman | G06Q 30/02 705/14.53 |
| 2006/0235994 | A1* | 10/2006 | Wu | H04L 69/329 709/238 |
| 2007/0022442 | A1* | 1/2007 | Gil | H04M 1/72445 725/62 |

(Continued)

FOREIGN PATENT DOCUMENTS

WO WO 2001/033437 * 5/2001 ............. G06Q 30/00
WO WO2011088053 A2 7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

Primary Examiner — Meredith A Long
Assistant Examiner — Christopher Stroud
(74) Attorney, Agent, or Firm — Lee & Hayes P.C.

(57) ABSTRACT

Techniques for selecting and providing highly targeted, interactive advertisements in a personalized manner. These advertisements may be audio-only advertisements, video-only advertisements, or advertisements that include both audio and video. As described below, advertisements may be selected and/or generated for a particular user based on an array of factors, including the user's interactions with multiple different client devices (e.g., a tablet computing device, a voice-controlled device, a television etc.), as well as additional behavior of the user. In some instances, the client devices may include a voice-controlled device that the user interacts with via voice commands and that provides audible content for output to the user.

22 Claims, 7 Drawing Sheets (56) References Cited

U.S. PATENT DOCUMENTS

| | | | |
|---|---|---|---|
| 2007/0244758 A1* | 10/2007 | Xie | G06Q 30/0253 705/26.1 |
| 2007/0250636 A1* | 10/2007 | Stephens | H04N 7/162 709/231 |
| 2008/0065486 A1* | 3/2008 | Vincent | G06Q 30/02 705/14.64 |
| 2008/0160974 A1* | 7/2008 | Vartiainen | G06F 9/4856 455/414.3 |
| 2008/0201731 A1* | 8/2008 | Howcroft | H04H 60/46 725/13 |
| 2009/0063279 A1* | 3/2009 | Ives | G06Q 30/00 705/14.73 |
| 2009/0064219 A1* | 3/2009 | Minor | G06Q 30/02 725/32 |
| 2009/0187463 A1* | 7/2009 | DaCosta | G06Q 30/02 705/14.58 |
| 2009/0199107 A1* | 8/2009 | Lewis | G06Q 30/0241 715/745 |
| 2009/0204901 A1* | 8/2009 | Dharmaji | G06Q 30/02 715/745 |
| 2009/0235307 A1* | 9/2009 | White | H04N 21/812 725/34 |
| 2010/0017261 A1* | 1/2010 | Evans | G06Q 30/0261 705/14.58 |
| 2010/0114706 A1* | 5/2010 | Kosuru | G06Q 30/02 705/14.66 |
| 2010/0158219 A1* | 6/2010 | Dhawan | H04M 1/2478 379/88.18 |
| 2011/0078020 A1* | 3/2011 | LaJoie | G06F 17/30743 705/14.53 |
| 2011/0082735 A1* | 4/2011 | Kannan | G06F 16/583 705/14.23 |
| 2011/0251887 A1* | 10/2011 | Paul | G06Q 30/02 705/14.42 |
| 2011/0264523 A1* | 10/2011 | Scott | H04W 4/18 705/14.62 |
| 2012/0011002 A1* | 1/2012 | Crowe | G06Q 30/0251 715/764 |
| 2012/0200391 A1* | 8/2012 | Sugiyama | G06F 21/31 340/5.82 |
| 2012/0223885 A1 | 9/2012 | Perez | |
| 2012/0317482 A1* | 12/2012 | Barraclough | G06F 40/149 715/716 |
| 2013/0117782 A1* | 5/2013 | Mehta | H04N 21/478 725/34 |
| 2013/0191122 A1* | 7/2013 | Mason | G06F 17/30017 704/231 |
| 2013/0246098 A1* | 9/2013 | Habboush | G06Q 10/10 705/3 |
| 2013/0246179 A1* | 9/2013 | Shrock | G06Q 30/0641 705/14.58 |
| 2013/0246392 A1* | 9/2013 | Farmaner | G06F 16/90332 707/769 |
| 2013/0254340 A1* | 9/2013 | Lang | H04H 60/74 709/218 |
| 2013/0275308 A1* | 10/2013 | Paraskeva | G06Q 20/32 705/71 |
| 2014/0006496 A1* | 1/2014 | Dearman | H04L 67/06 709/204 |
| 2014/0108144 A1* | 4/2014 | Kumar | G06Q 30/0277 705/14.54 |
| 2014/0149538 A1* | 5/2014 | Deeter | H04L 67/55 709/217 |
| 2014/0278998 A1* | 9/2014 | Systrom | G06Q 30/0277 705/14.57 |
| 2014/0280541 A1* | 9/2014 | Walter | H04L 67/30 709/204 |
| 2014/0330559 A1* | 11/2014 | Higbie | G10L 17/22 704/235 |

\* cited by examiner

INTERACTIVE, PERSONALIZED ADVERTISING

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes, in part, techniques for selecting and providing highly targeted, interactive advertisements in a personalized manner. These advertisements may be audio-only advertisements, video-only advertisements, or advertisements that include both audio and video. As described below, advertisements may be selected and/or generated for a particular user based on an array of factors, including the user's interactions with multiple different client devices (e.g., a tablet computing device, a voice-controlled device, a television etc.), as well as additional behavior of the user. In some instances, the client devices may include a voice-controlled device that the user interacts with via voice commands and that provides audible content for output to the user.

In order to determine a relevant advertisement to provide to an example user, the techniques described below take into account multiple factors, such as the content that the user has previously consumed. This content may include an audio-only content item (e.g., an audio book, an internet-radio station, a traditional radio program, etc.) or a visual or audio/visual content item (e.g., a television show, a website, etc.). In one example, a voice-controlled device resides in the environment in which the user consumes the content item. As such, the device may generate an audio signal that includes audible content output within the environment. With that signal, the device may identify the content that the user has consumed or may provide the audio signal to one or more remote computing devices for identifying the content item. The techniques may then use this information to determine a relevant advertisement to provide to the user. For instance, if the remote computing devices determine, from the audio signal, that the user is watching basketball on television, then the techniques may provide an advertisement for tickets to a basketball team that is local to the user.

In addition to using content that the user has consumed, the techniques may reference other previous behavior of the user to determine an advertisement to generate and/or provide to the user. For instance, the user may be associated with an account at a service provider, hosted by the remote computing devices discussed above. As such, the techniques may log the user's interactions with the service provider, and potentially other service providers, across multiple different client devices. These devices may include a voice-controlled device, a tablet computing device, a desktop computer, an electronic book reader device, a laptop computer, a mobile phone, or the like. The logged behavior, meanwhile, may include items and services previously purchased or otherwise acquired by the user, a browsing history of the user, the user's responses to advertisements previously served to the user, and the like. In addition, when the user utilizes a voice-controlled device and/or another client device to create a "to-do list"—or list of tasks to be performed by the user—the techniques may utilize this information when generating and/or selecting an advertisement for the user. For instance, if the user has previously added, to his to-do list, a task to purchase a birthday present for his wife, the techniques may generate and/or select an advertisement to provide to the user based on this task (e.g., may recommend a particular item to purchase for the wife of the user). In some instances, other users may additionally or alternatively add tasks to a task list. For example, a household may collectively create and add items to a list of grocery items needed from the grocery store.

In addition, the techniques may take into account the geo-location associated with the user when determining an advertisement to provide to the user, as utilized above in the example of the advertisement for the basketball tickets. The techniques may further use additional demographics associated with the user to select an advertisement, with this information including an age of the user, a gender of the user, an income level of the user, and the like.

After selecting an advertisement to serve to the user based on some or all of the above-referenced information, the techniques may select a format of the advertisement and/or a device to which to serve the advertisement to. For instance, the techniques may reference responses from the user to previous advertisements served to different client devices of the user to determine which device or advertisement format was most effective. For instance, the techniques may determine that the user most often requests additional information when an audio advertisement is output by a voice-controlled device associated with the user, but often disregards audio/visual advertisements provided to the user's tablet computing device. As such, the techniques may determine to provide an audio advertisement to the voice-controlled device of the user.

The techniques described above may further reference a location of the user when selecting which device to provide the advertisement to. For instance, the techniques may reference past performance of advertisements served to different locations when selecting the format and/or device on which to output the advertisement. To provide an example, the techniques may determine that the user often requests to acquire items referenced in audio advertisements when the user is at home, and replies more favorably to visual-only advertisements when at an office of the user. In addition, the techniques may reference a distance from the user to one or more client devices when determining which format and/or device on which to output the advertisement. For instance, the techniques may determine a location of the user and locations of devices of the user, and may select one or more devices that are proximate to the user.

In some instances, the advertisements provided to the user may be interactive such that the user may request to acquire an item referenced in advertisement or may request additional information regarding the item while or after the selected device outputs the respective advertisement. For instance, if the techniques determine to output an audio advertisement on a voice-controlled device, the voice-controlled device may be ready to receive a user's voice command pertaining to the advertisement either during or after playback of the audio advertisement. Upon recognizing speech (e.g., a predefined word or phrase) of the user, the techniques may instruct the device to alter output of the audio advertisement (e.g., cease output, lower the volume, pause the output, etc.) and may attempt to identify the voice command of the user. Upon identifying the voice command, the techniques may cause performance of a corresponding action, such as purchasing the item for the user, obtaining and outputting additional information regarding the item, or the like. The user may similarly interact with visual-only or audio/visual advertisements on an array of different devices.

The devices and techniques introduced above may be implemented in a variety of different architectures and contexts. One non-limiting and illustrative implementation is described below.

Figure 1:
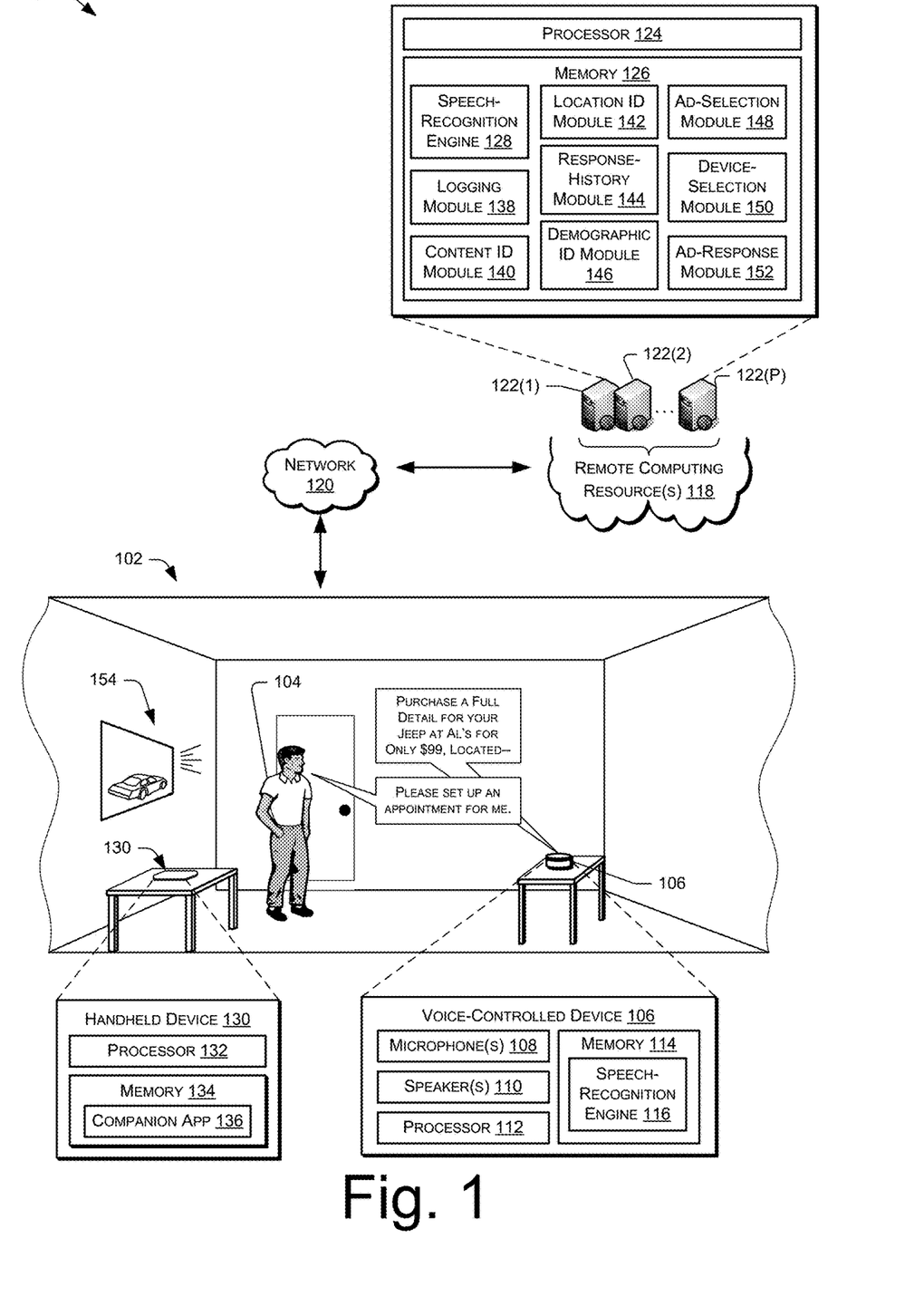
FIG. 1 shows an illustrative voice interaction computing architecture set in a home environment. The architecture includes a voice-controlled device physically situated in the home and communicatively coupled to remote computing resources.

FIG. 1 shows an illustrative voice interaction computing architecture 100 set in a home environment 102 that includes a user 104. The architecture 100 also includes an electronic voice-controlled device 106 with which the user 104 may interact. In the illustrated implementation, the voice-controlled device 106 is positioned on a table within a room of the home environment 102. In other implementations, it may be placed or mounted in any number of locations (e.g., ceiling, wall, in a lamp, beneath a table, under a chair, etc.). Further, more than one device 106 may be positioned in a single room, or one device may be used to accommodate user interactions from more than one room.

Generally, the voice-controlled device 106 has a microphone unit comprising at least one microphone 108 and a speaker unit comprising at least one speaker 110 to facilitate audio interactions with the user 104 and/or other users. In some instances, the voice-controlled device 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic device 106 may be through voice input and audible output. One example implementation of the voice-controlled device 106 is provided below in more detail with reference to FIG. 7.

The microphone 108 of the voice-controlled device 106 detects audio from the environment 102, such as sounds uttered from the user 104. As illustrated, the voice-controlled device 106 includes a processor 112 and memory 114, which stores or otherwise has access to a speech-recognition engine 116. As used herein, a processor may include multiple processors and/or a processor having multiple cores. The speech-recognition engine 116 performs speech recognition on audio signals generated based on sound captured by the microphone, such as utterances spoken by the user 104. The voice-controlled device 106 may perform certain actions in response to recognizing different speech from the user 104. The user may speak predefined commands (e.g., "Awake"; "Sleep"), or may use a more casual conversation style when interacting with the device 106 (e.g., "I'd like to go to a movie. Please tell me what's playing at the local cinema.").

In some instances, the voice-controlled device 106 may operate in conjunction with or may otherwise utilize computing resources 118 that are remote from the environment 102. For instance, the voice-controlled device 106 may couple to the remote computing resources 118 over a network 120. As illustrated, the remote computing resources 118 may be implemented as one or more servers 122(1), 122(2), . . . , 122(P) and may, in some instances, form a portion of a network-accessible computing platform implemented as a computing infrastructure of processors, storage, software, data access, and so forth that is maintained and accessible via a network such as the Internet. The remote computing resources 118 do not require end-user knowledge of the physical location and configuration of the system that delivers the services. Common expressions associated for these remote computing resources 118 include "on-demand computing", "software as a service (SaaS)", "platform computing", "network-accessible platform", "cloud services", "data centers", and so forth.

The servers 122(1)-(P) may include a processor 124 and memory 126. As illustrated, the memory 126 may store and utilize a speech-processing engine 128 for receiving audio signals from the device 106, recognizing speech and, potentially, causing performance of an action in response. For instance, the engine 128 may identify speech within an audio signal by performing natural language understanding (NLU) techniques on the audio signal. In addition, the engine 128 may provide audio for output on a client device (e.g., the device 106) via text-to-speech (TTS). In some examples, the voice-controlled device 106 may upload audio data to the remote computing resources 118 for processing, given that the resources 118 may have a computational capacity that far exceeds the computational capacity of the voice-controlled device 106. Therefore, the voice-controlled device 106 may utilize the speech-processing engine 128 for performing relatively complex analysis on audio captured from the environment 102.

Regardless of whether the speech recognition occurs locally or remotely from the environment 102, the voice-controlled device 106 may receive vocal input from the user 104 and the device 106 and/or the resources 118 may perform speech recognition to interpret a user's operational request or command. The requests may be for essentially any type of operation, such as database inquires, requesting and consuming entertainment (e.g., gaming, finding and playing music, movies or other content, etc.), personal management (e.g., calendaring, note taking, etc.), online shopping, financial transactions, and so forth. In some instances, the device 106 also interacts with a client application stored on one or more client devices of the user 104, such as example handheld device 130. As illustrated, the handheld device 130 includes a processor 132 and memory 134, which stores a companion application 136.

In some instances, the user 104 may also interact with the device 106 through this "companion application". For instance, the user 104 may utilize a graphical user interface (GUI) of the companion application displayed on the handheld device 130 (or any other client device) to make requests to the device 106 in lieu of voice commands. Additionally or alternatively, the device 106 may communicate with the companion application to surface information to the user 104, such as previous voice commands provided to the device 106 by the user (and how the device interpreted these commands), content that is supplementary to a voice command issued by the user (e.g., cover art for a song playing on the device 106 as requested by the user 104), advertisements, and the like. In addition, in some instances the device 106 may send an authorization request to a companion application in response to receiving a voice command, such that the device 106 does not comply with the voice command until receiving permission in the form of a user response received via the companion application.

The voice-controlled device 106 may communicatively couple to the network 120 via wired technologies (e.g., wires, USB, fiber optic cable, etc.), wireless technologies (e.g., WiFi, RF, cellular, satellite, Bluetooth, etc.), or other connection technologies. The network 120 is representative of any type of communication network, including data and/or voice network, and may be implemented using wired infrastructure (e.g., cable, CAT5, fiber optic cable, etc.), a wireless infrastructure (e.g., WiFi, RF, cellular, microwave, satellite, Bluetooth, etc.), and/or other connection technologies.

In addition to receiving and responding to voice commands from the user (via the voice-controlled device 106), the remote computing resources may generate, select, and/or provide advertisements to the user 104 that are personalized to the user 104. That is, the remote computing resources 118 may identify metrics associated with the user (e.g., demographic information, previous purchases, etc.) and may select advertisement(s) to present to the user based on a correlation between one or more advertisements and the metrics. In addition, the user 104 may utilize the voice-controlled device 106, the handheld device 130, and/or other client devices of the user 104 to respond to the advertisements. The responses may include a request for additional information regarding a product referenced in the advertisement, a request to acquire the item referenced in the advertisement, feedback regarding whether or not the user 104 found the advertisement helpful, or the like.

As illustrated, the memory 126 of the remote computing resources 118 has access to a logging module 138, a content identification (ID) module 140, a location ID module 142, a response-history module 144, a demographic-ID module 146, an ad-selection module 148, a device-selection module 150, and an ad-response module 152. At a high level, the ad-selection module 148 may select one or more advertisements to output to the user based on an array of information associated with the user. The device-selection module 150, meanwhile, selects one or more client devices of the user on which to output the advertisement(s), also based on an array of information associated with the user. The ad-response module 152 then performs an action based on receiving a response from the user pertaining to the advertisement. For instance, the module 152 may purchase an item for the user 104, may provide additional information regarding an item, or may otherwise comply with other responses provided by the user 104.

In order to provide advertisements that are personalized or otherwise selected for the user 104, the remote computing resources 118 may reference past behavior of the user, which the logging module 138 may log. This past behavior may include past purchases made by the user, a browsing history of the user on an array of client devices, demographic information of the user, interests of the user, content previously consumed by the user (including content being consumed by the user 104 in real-time), responses by the user 104 to advertisements previously presented to the user 104, a geo-location of the user (either generally or at a particular time), and/or any other type of behavior or information otherwise associated with the user.

When storing this data, the logging module 138 may store an indication of the content accessed/consumed by the user, a time at which the user accessed the content, and the like. The logging module 138 may obtain this information from an array of sources. For instance, if a user utilizes client devices associated with a common entity (e.g., a common vendor that provides the devices, a common service provider that provides services across the devices, etc.), then the common entity may collectively aggregate and store this information, such as the content viewed by the user, the device on which the user accessed the content, a time and date at which the user accessed the content, a length for which the user viewed the content, and the like.

The content ID module 140 may function to identify content previously consumed by the user. This may include referencing a user account of the user at internet radio service provider(s) to identify music or audio books listened to by the user 104, referencing a user account at video-based or television-based service provider(s) to identify video content consumed by the user 104, referencing a user account at service provider(s) that provide electronic books (e.g., news articles, novels, etc.) to determine eBooks consumed by the user, and the like. For example, the content ID module 140 may request, from the user, credentials of the user associated with one or more of these accounts. The module 140 may then utilize these credentials to sign into the user's account and query, from the service(s), the information referenced above, such as content previously consumed by the user. The content ID module 140 may then provide this information to the logging module 138 such that the logging module 138 may store this information for later use by the ad-selection module 148 when selecting an advertisement for the user 104.

In addition, the content ID module 140 may receive audio signals generated by the microphone 108 of the voice-controlled device 106 to identify content that the user is consuming within the environment 102. For instance, FIG. 1 illustrates that a television 154 of the user 104 is currently showing a car race that includes both video and audio. The microphone 108 may, with the permission of the user 104, generate an audio signal based on sound within the environment 102, with this sound including the audio content of the car race. After receiving this audio signal the content ID module 140 may attempt to identify the show that the user 104 is currently watching on the television 154. For instance, the content ID module 140 may perform speech recognition on the audio signal to identify the audio content, and may compare this audio content to metadata associated with an array of currently broadcasted television shows, movies, and the like to identify the content. That is, the content ID module 140 may receive metadata associated with multiple shows currently being broadcast and may compare the audio content from the uploaded audio signal to identify the show that the television 154 is currently outputting. The module 140 may, again, provide this information to the logging module 138 for later use by the ad-selection module 148.

The location ID module 142, meanwhile, may function to identify a location of the user 104 for use in selecting an advertisement for output to the user 104. In some instances, this location comprises a geo-location (e.g., a city and state of the user 104) determined from demographic information associated with the user 104 and determined from a user account of the user 104 at the remote computing resources 118. For example, the user may have previously indicated, within the account, the current city and state of the user. The location ID module 142 may then reference this information in determining an advertisement to provide to the user. In other instances, the location ID module 142 may determine a more fine-grain location of the user 104, such as whether the user 104 is currently at his home, office, in the car, etc. The module 142 may identify this location in a number of ways. For instance, the location ID module 142 may reference a reported location of a client device of the user 104 (e.g., the handheld device 130, a mobile phone of the user 104, etc.), which may be determined using GPS coordinates, triangulation techniques, or the like. In another example, in instances where the voice-controlled device 106 is generally fixed (e.g., within the user's home or office), the location ID module 142 may determine that the user is at home (or at the office) when the speech-recognition engine 128 identifies speech of the user 104.

The response-history module 144, meanwhile, may identify responses of the user 104 to prior advertisements provided to the user 104. This may include how the user 104 responded to advertisements of different formats (e.g., audio only, video only, audio/video), how the user 104 responded to advertisements on different client devices, at different locations, at different times, and the like. Again, the logging module 138 may log this information for later use when selecting an advertisement to provide to the user 104.

The demographic ID module 146 may function to identify demographic information of the user 104 for use in selecting advertisements for the user 104. This may include a user's age, gender, income level, number and age of family members, occupation, and other demographic information traditionally used to identify targeted advertising.

After the logging module 138 logs information provided by the afore-mentioned modules, the ad-selection module 148 may select one or more advertisements to provide to the user 104 that are highly targeted to the user 104. The device-selection module 150, meanwhile, may determine an appropriate device or devices to which to provide the selected advertisement.

In the illustrated example, for instance, the ad-selection module 148 has determined that the user is currently at home and is currently watching the illustrated car race. The ad-selection module 148 may also have determined, from the information logged by the logging module 138, that the user responds most favorably to audio advertisements output by the voice-controlled device 106. As such, the ad-selection module 148 has selected to output an audio advertisement pertaining to a car-detailing service. In addition, the module 148 has identified a car-detailing service provider that is local to the geo-location of the user 104 and has inserted an offer from this particular service provider into the advertisement. Even more specifically, because the ad-selection module 148 may determine that the user drives a jeep (from the information logged by the logging module 138), the module 148 may include this information when customizing the advertisement. As such, the module 148 provides the following advertisement for output by the device 106: "Purchase a full detail for your Jeep at Al's for only $99, located . . . ."

Because these advertisements may be interactive, the user 104 responds to the advertisement before the device 106 has finished outputting the entire advertisement. In this example, the user 104 has decided to acquire the offer, stating "Please set up an appointment for me." The microphone 108 of the device 106 may generate an audio signal that includes this voice command and may provide this audio signal to the remote computing resources 118. Upon the speech-recognition engine 128 identifying the voice command, the ad-response module 152 may perform an action corresponding to the voice command. In this instance, the module 152 may proceed to book a car-detailing appointment for the user 104 at Al's. In addition, the module 152 may take into account information associated with user 104 when making this request. For instance, the module 152 may reference a schedule associated with the user to determine a time at which to book an appointment and may provide this information along with the type of vehicle (here, a Jeep) to Al's when setting up the appointment. The module 152 may also provide payment information to Al's.

While this example illustrates providing an audio-only advertisement to the user 104, in other examples the ad-selection module 148 may choose to provide a different format of advertisement to the user or, potentially, advertisements of different formats. For instance, the module 148 may provide a visual advertisement for the car-detailing service to the handheld device 130 of the user 104 in addition to the audio advertisement provided to the voice-controlled device 106. In addition, the device-selection module 150 may determine to output the advertisement(s) on one or more different devices, such as the handheld device 130, a mobile phone of the user, and/or the like. In some instances, the device-selection module 150 may make this selection based on a location of the user and proximity of client devices to the user. For instance, if the module 150 determines that the user has recently provided a voice command to the voice-controlled device 106, then the module 150 may determine that the user is proximate to the device 106 and, hence, may select this device for presenting an advertisement based on this close proximity to the user. Additionally or alternatively, the module 150 may reference prior interactions between the user and one or more devices to determine which devices on which the user has responded to advertisements, which devices the user has not responded to advertisements on, and the like.

In one example, the ad-selection module 148 may determine to surface an advertisement on the companion application of a device of the user, such as the handheld device 130. In some instances, the module 148 may make a determination to surface an advertisement on the companion application based on one or more criteria, such as how well the advertisement has performed in the past, based on a confidence score indicating how likely it is that the user will respond to the advertisement (e.g., as calculated by the module 148, or the like).

Furthermore, the module 148 may reference an array of criteria when determining which vendor to select for providing the advertisement and/or which service provider to select for selecting the vendor to provide the advertisement. For instance, the module 148 may reference a service provider that is most often used by the user and may reference a rating of different vendors on the service provider in order to select the vendor to associate with the advertisement. For instance, in the example above, the module 148 may use a service provider most often used by user 104 and may analyze the ratings of different vendors that offer car detailing services. The module 148 may then select to provide an advertisement for "Al's" based at least in part on a rating associated with Al's. The module 148 may also take one or more other criteria into account, such as a distance between a home of the user and different vendors, or the like.

Figure 2:
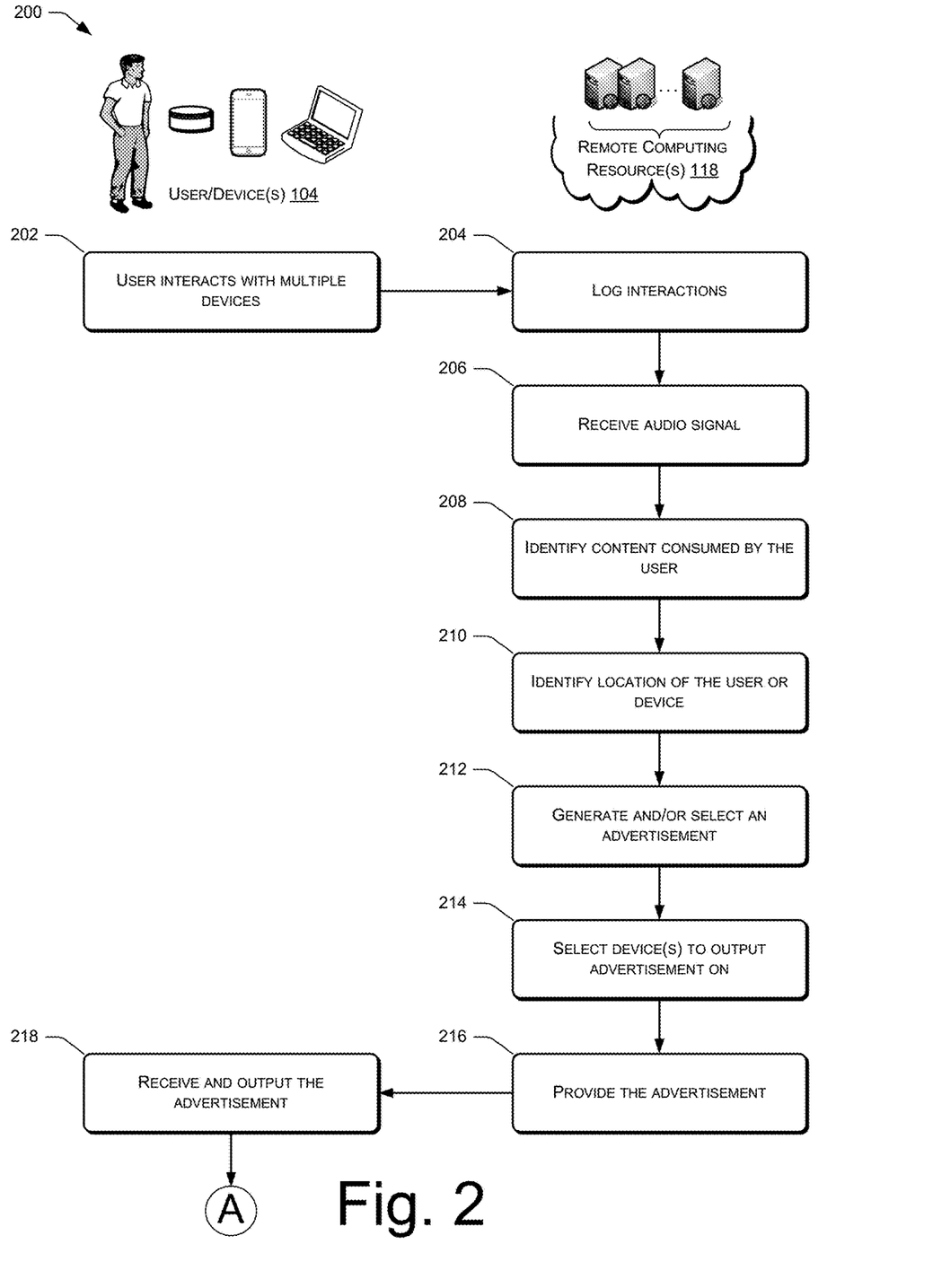
FIGS. 2-3 collectively illustrate an example flow diagram that includes a user interacting with multiple client devices, including a voice-controlled device, and remote computing resources selecting an advertisement to provide to the user based on these interactions.
Figure 3:
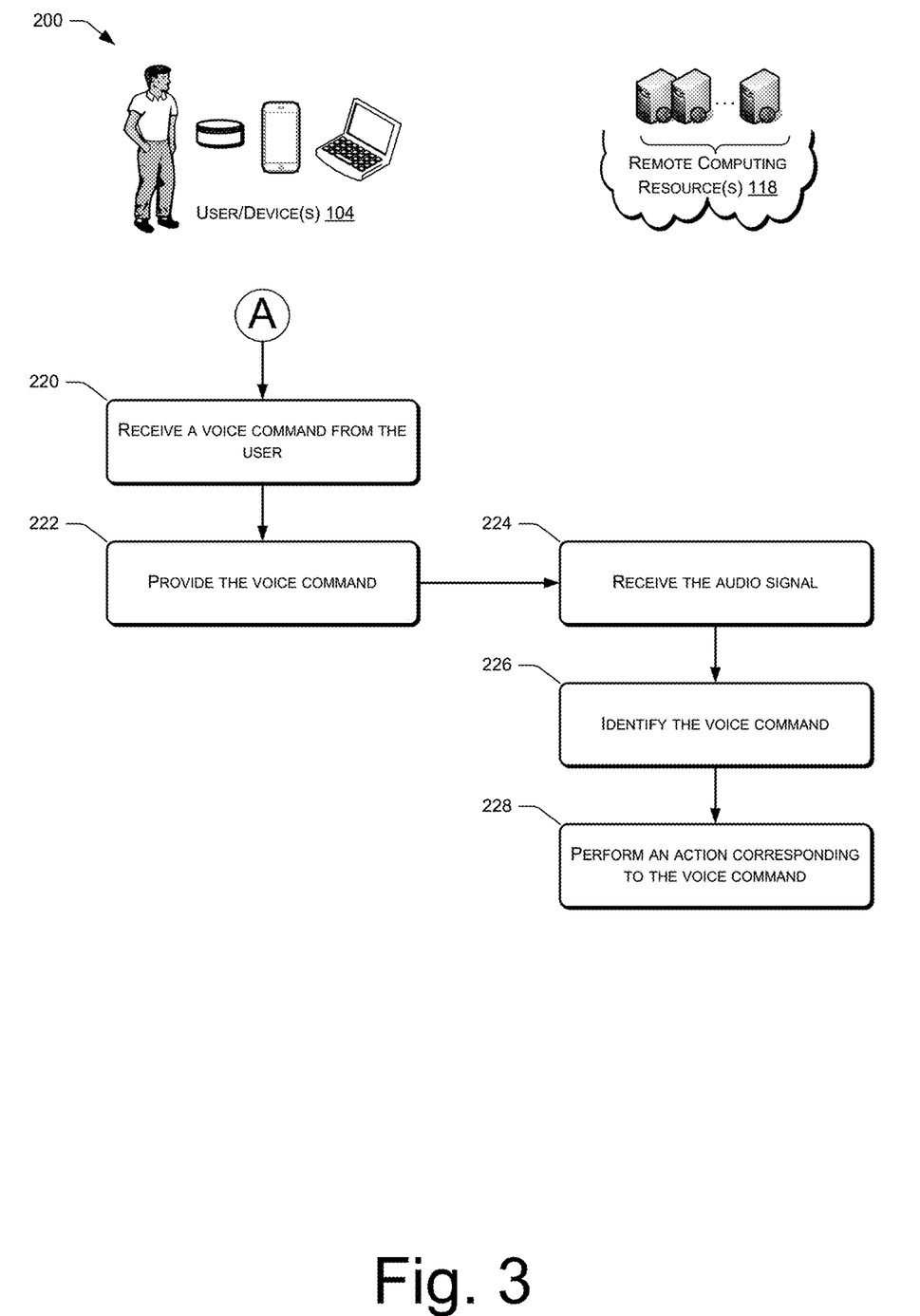

FIGS. 2-3 collectively illustrate an example process 200 that includes a user interacting with multiple client devices, including the example voice-controlled device 106, and the remote computing resources 118 selecting an advertisement to provide to the user based on these interactions. Each process described herein is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The process 200 includes, at 202, the user interacting with multiple client devices, including the voice-controlled device 106. These interactions may include the user web-browsing on a desktop computer, making voice commands to the device 106, or the like. At 204, the remote computing resources 118 log these interactions in association with the user.

At 206, the resources 118 may receive an audio signal generated by the voice-controlled device 106, with this audio signal representing sound captured within an environment of the user 104. At 208, the remote computing resources 118 may identify content being consumed by the user, such as a broadcast television show, a movie, a terrestrial radio station, an internet radio station, music owned by the user, or the like. At 210, meanwhile, the resources 118 may identify a location of the user, which may include a city in which the user resides, a location within a house of the user, or any other location information.

At 212, the resources 118 generate and/or select an advertisement for output to the user 104 based on some or all of the information described above, such as the user's past behavior (e.g., purchase history, browse history, etc.), the content previously consumed by the user 104 (including content consumed minutes or seconds before), a location of the user 104, tasks from a to-do list created by the user, and/or the like. In some instances, the remote computing resources 118 may generate some or all of the advertisement. For instance, the resources 118 may select an advertisement for car detailing and may customize this advertisement based on information associated with the user 104, as described above.

At 214, the remote computing resources 118 may select one or more devices on which to output the selected advertisement(s). Again, this may be based on some or all of the information described above, such as responses by the user to advertisements previously provided to the user. At 216, the resources 118 provide the advertisement(s) to the selected device(s), which receive and output the advertisements at 218.

FIG. 3 continues the illustration of the process 200 and includes, at 220, a client device of the user (e.g., the device 106) receiving a voice command pertaining to the output advertisements from the user 104. At 222, the device provides the voice command (e.g., in the form of an audio signal, a text string, or the like) to the remote computing resources 118. The resources 118 receive an indication of this voice command at 224.

At 226, the remote computing resources 118 identify the voice command and, at 228, perform an action corresponding to the voice command. This action may include providing additional information to a device of the user, purchasing an item on behalf of the user, logging a user's indication of whether or not the user found the advertisement helpful, or the like. In some instances, the user may need to authenticate prior to the remote computing resources 118 performing the action corresponding to the voice command. Whether or not a user needs to authenticate, or an amount of authentication needed, may vary based on the requested activity in some instances. For example, the remote computing resources 118 may not require a user to authenticate if the user is requesting additional information about an advertised item, but may request that the user authenticate (e.g., by stating a user name and password associated with an account of the user) if the user requests to purchase the item.

While FIGS. 2-3 illustrate one example user experience, in other instances the user may have several back-and-forth interactions with the voice-controlled device 106 prior to and/or after the surfacing of the advertisement. For instance, the voice-controlled device 106 and/or other devices associated with the user 104 may pose questions to the user 104 and may base the selected advertisement at least partly upon the user's responses to the questions.

Figure 4:
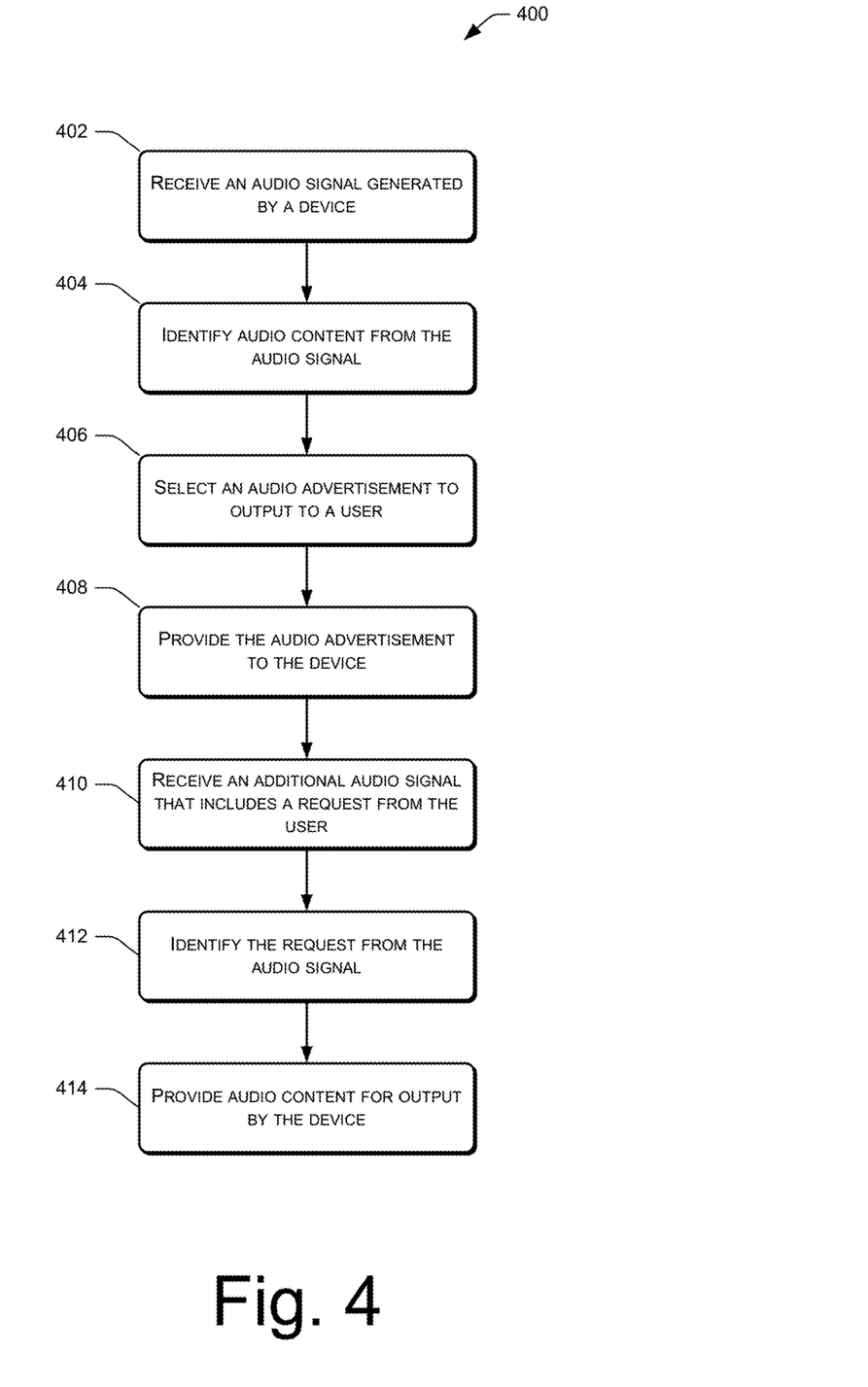
FIG. 4 illustrates a process for selecting an audio advertisement based at least in part on content identified from an audio signal representing sound captured in an environment of a user.

FIG. 4 depicts another process 400 for selecting an audio advertisement based at least in part on content identified from an audio signal representing sound captured in an environment of a user. At 402, the process 400 receives an audio signal generated by a device, with this audio signal representing content that a user is currently consuming within an environment. At 404, the process 400 identifies the content from the audio signal and, at 406, selects an audio advertisement to output to the user based at least in part on the identified content.

At 408, the process 400 provides the selected audio advertisement for output by the client device of the user, which may comprise the voice-controlled device 106. At 410, after the client device outputs at least a portion of the advertisement, the process 400 receives an additional audio signal from the device, with this additional signal representing a request pertaining to the advertisement from the user. At 412, the process 400 identifies the request and, at 414, performs an action corresponding to this request, such as providing additional information, purchasing an item for the user, or the like.

Figure 5:
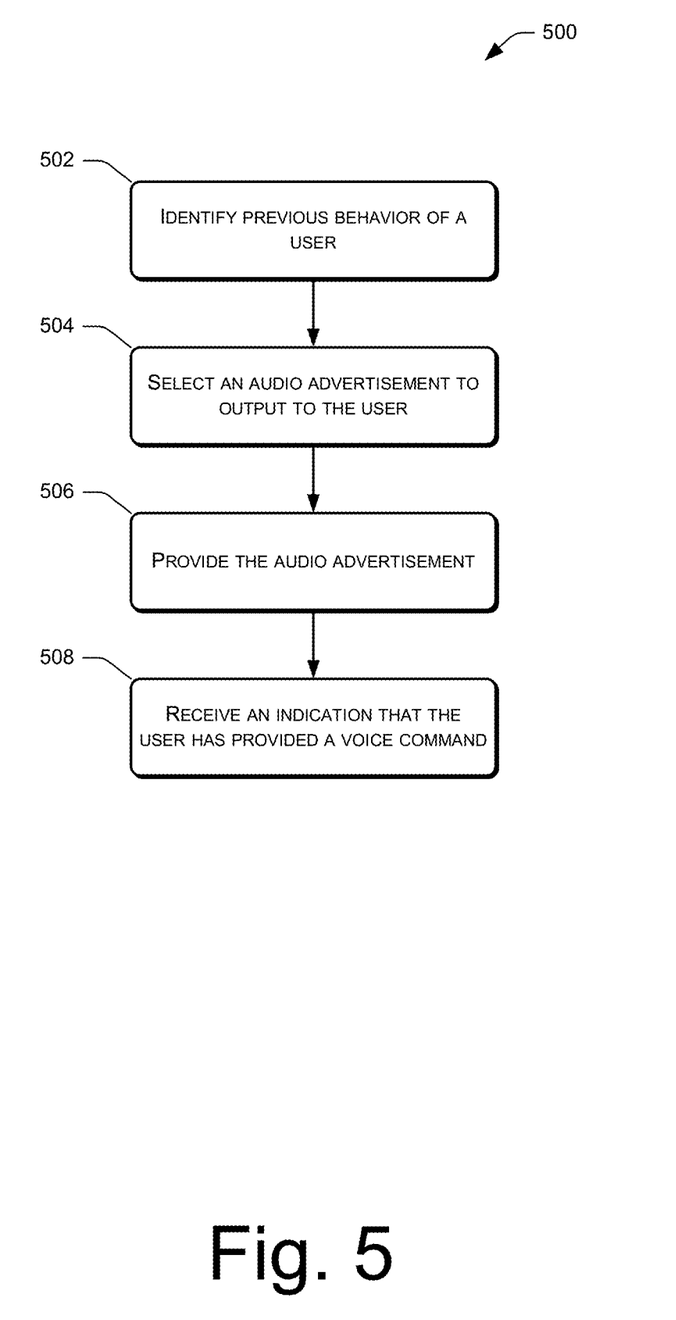
FIG. 5 illustrates a process for selecting an audio advertisement for a user based at least in part on prior behavior of the user.

FIG. 5 depicts a process 500 for selecting an audio advertisement for a user based at least in part on prior behavior of the user. At 502, the process 500 identifies previous behavior of the user, which may include any of the behavior described above. At 504, the process 500 selects an audio advertisement for output to the user, based at least in part on the prior behavior. At 506, the process 500 provides the audio advertisement to a device of the user. Finally, at 508, the process 500 receives an indication that the user has provided a voice command pertaining to the advertisement.

Figure 6:
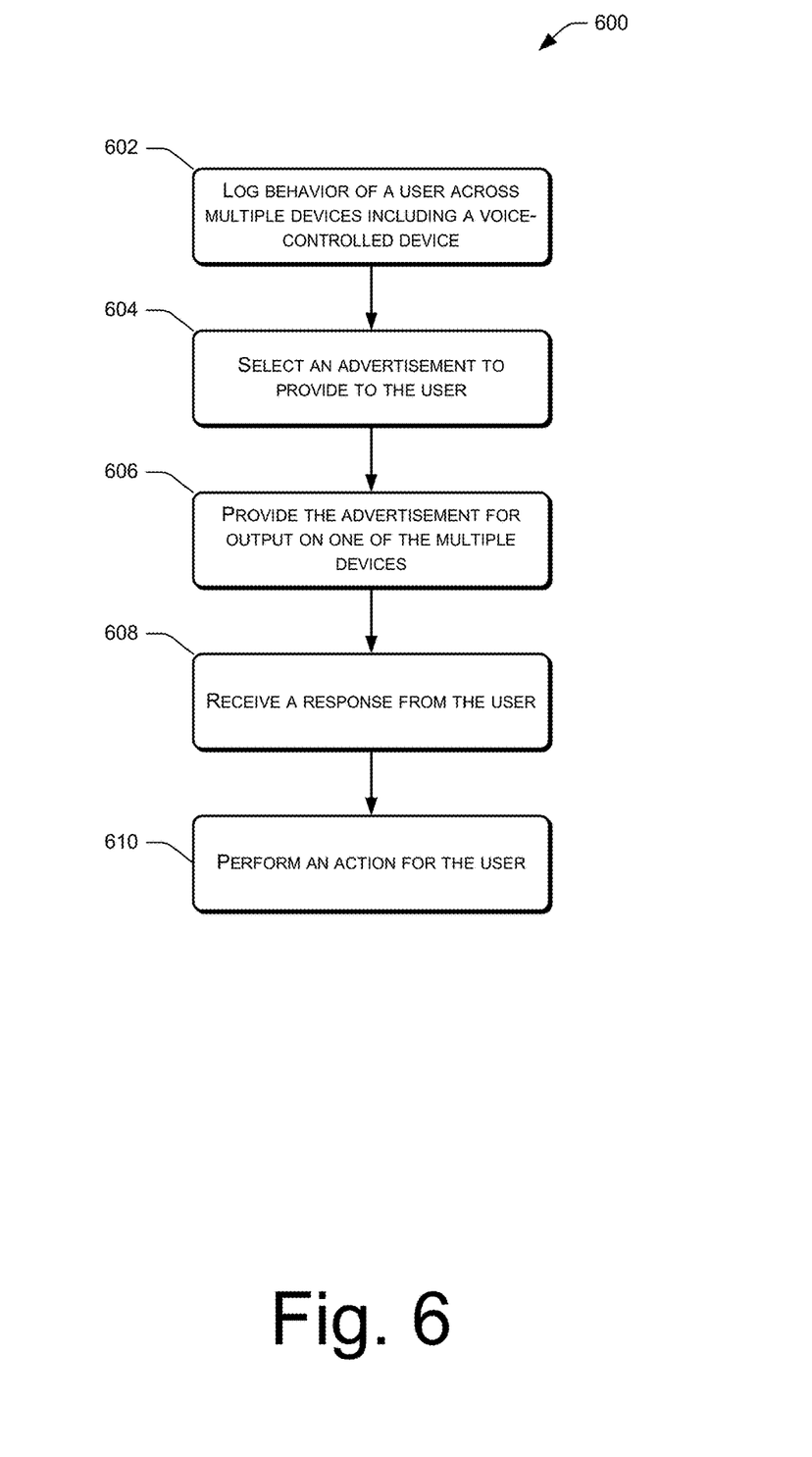
FIG. 6 illustrates a process for selecting an advertisement (e.g., audio, video, or both) for a user based at least in part on prior interactions between the user and multiple client devices, including a voice-controlled device.

FIG. 6 depicts a process 600 for selecting an advertisement (e.g., audio, video, or both) for a user based at least in part on prior interactions between the user and multiple client devices, including a voice-controlled device. At 602, the process 600 logs behavior of a user across multiple client devices, including the voice-controlled device. At 604, the process 600 selects an advertisement to provide to the user based at least in part on the logged behavior. At 606, the process 600 provides the advertisement for output on a client device of the user and, at 608, receives a user response to the advertisement. At 610, the process 600 performs an action for the user, with this action being based at least in part on the user response received at 608.

Figure 7:
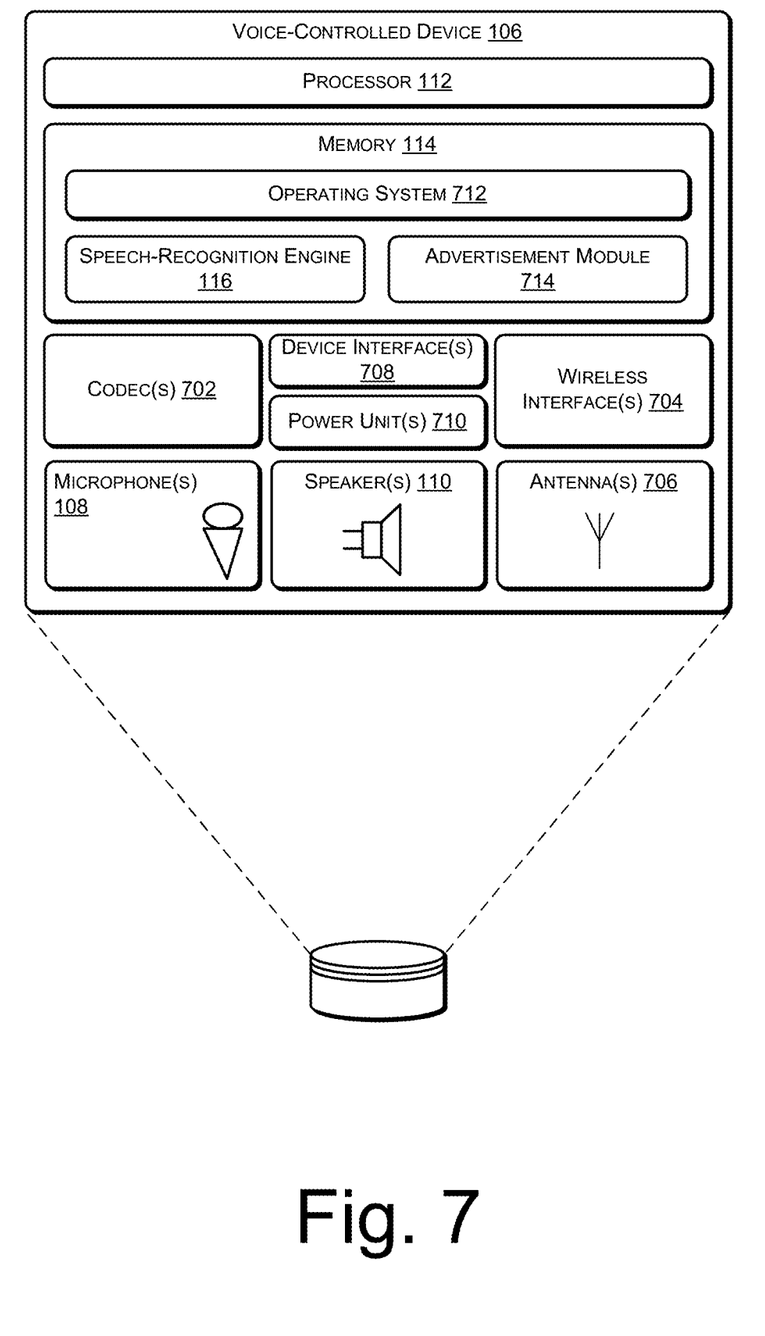
FIG. 7 shows a block diagram of selected functional components implemented in the voice-controlled device of FIG. 1.

FIG. 7 shows selected functional components of one implementation of the voice-controlled device 106 in more detail. Generally, the voice-controlled device 106 may be implemented as a standalone device that is relatively simple in terms of functional capabilities with limited input/output components, memory and processing capabilities. For instance, the voice-controlled device 106 does not have a keyboard, keypad, or other form of mechanical input in some implementations, nor does it have a display or touch screen to facilitate visual presentation and user touch input. Instead, the device 106 may be implemented with the ability to receive and output audio, a network interface (wireless or wire-based), power, and limited processing/memory capabilities.

In the illustrated implementation, the voice-controlled device 106 includes the processor 112 and memory 114. The memory 114 may include computer-readable storage media ("CRSM"), which may be any available physical media accessible by the processor 112 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 112.

The voice-controlled device 106 includes a microphone unit that comprises one or more microphones 108 to receive audio input, such as user voice input. The device 106 also includes a speaker unit that includes one or more speakers 110 to output audio sounds. One or more codecs 702 are coupled to the microphone(s) 108 and the speaker(s) 110 to encode and/or decode the audio signals. The codec may convert audio data between analog and digital formats. A user may interact with the device 106 by speaking to it, and the microphone(s) 108 captures sound and generates an audio signal that includes the user speech. The codec(s) 702 encodes the user speech and transfers that audio data to other components. The device 106 can communicate back to the user by emitting audible statements through the speaker(s) 110. In this manner, the user interacts with the voice-controlled device simply through speech, without use of a keyboard or display common to other types of devices.

In the illustrated example, the voice-controlled device 106 includes one or more wireless interfaces 704 coupled to one or more antennas 706 to facilitate a wireless connection to a network. The wireless interface(s) 704 may implement one or more of various wireless technologies, such as wifi, Bluetooth, RF, and so on.

One or more device interfaces 708 (e.g., USB, broadband connection, etc.) may further be provided as part of the device 106 to facilitate a wired connection to a network, or a plug-in network device that communicates with other wireless networks. One or more power units 710 are further provided to distribute power to the various components on the device 106.

The voice-controlled device 106 is designed to support audio interactions with the user, in the form of receiving voice commands (e.g., words, phrase, sentences, etc.) from the user and outputting audible feedback to the user. Accordingly, in the illustrated implementation, there are no or few haptic input devices, such as navigation buttons, keypads, joysticks, keyboards, touch screens, and the like. Further there is no display for text or graphical output. In one implementation, the voice-controlled device 106 may include non-input control mechanisms, such as basic volume control button(s) for increasing/decreasing volume, as well as power and reset buttons. There may also be one or more simple light elements (e.g., LEDs around perimeter of a top portion of the device) to indicate a state such as, for example, when power is on or to indicate when a command is received. But, otherwise, the device 106 does not use or need to use any input devices or displays in some instances.

Several modules such as instruction, datastores, and so forth may be stored within the memory 114 and configured to execute on the processor 112. An operating system module 712 is configured to manage hardware and services (e.g., wireless unit, Codec, etc.) within and coupled to the device 106 for the benefit of other modules. In addition, the memory 114 may include the speech-recognition engine 116 and an advertisement module 714. The advertisement module may include some or all of the modules described with reference to FIG. 1 as being stored in the memory 126 of the remote computing resources 118. As such, the advertisement module 714 may generally function to select one or more advertisements that have been personalized for a user.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
   under control of one or more remote computing systems configured with executable instructions,
   receiving, via a communication network, first media content from a first device in an environment that includes a user and a second device, wherein the first device is a voice-controlled device, the second device includes a display, and the first media content represents first speech captured by the first device;
   performing speech recognition on the first media content to identify an item that is referenced in the first speech;

determining a first location associated with the first device;
determining a second location associated with the second device;
determining that a first format of first previous media content to which a first user response was received is an audio-content format, the first user response received from the first device;
determining that a second format of second previous media content to which a second user response was received is a video-content format, the second user response received from the second device;
receiving second media content from the first device, based at least in part on sound associated with a program being output by a third device;
analyzing the second media content to identify the program;
selecting at least one of third media content or fourth media content to output based at least on part on the program and the item;
selecting, based at least in part on the first location, the determining that the first format of the first previous media content to which the first user response was received is the audio-content format, and the first user response including a first online purchase request associated with a first previous item identified by the first previous media content, the first device to receive the third media content in the audio-content format;
selecting, based at least in part on the second location, the determining that the second format of the second previous media content to which the second user response was received is the video-content format, and the second user response including a second online purchase request associated with a second previous item identified by the second previous media content, the second device to receive the fourth media content in the video-content format;
sending, via the communication network, to the first device and based at least in part on the selecting the first device, the third media content in the audio-content format;
sending, via the communication network, to the second device and based at least in part on the selecting the second device, the fourth media content in the video-content format;
receiving, via the communication network and from the first device, fifth media content in the audio-content format representing second speech;
determining that at least a portion of the fifth media content in the audio-content format corresponds to a predefined phrase; and
based at least in part on the determining that the at least the portion of the fifth media content corresponds to the predefined phrase, determining a request to acquire the item.

2. The method as recited in claim 1, further comprising determining at least one metric of a current location of the user, a purchase history of the user, or a demographic associated with the user, wherein sending the third media content is performed with reference to a correlation between the first previous media content and the at least one metric.

3. The method as recited in claim 1, wherein the request is received during output of the third media content on the first device, and further comprising instructing the first device to cease output of the third media content at least partly in response to recognizing the request.

4. The method as recited in claim 1, further comprising determining a correlation between a geo-location of the user and prior purchase behavior of the user to third previous media content presented at one or more user devices of the user while at the geo-location, wherein generating the third media content is further based at least in part on the correlation.

5. The method as recited in claim 1, further comprising providing sixth media content in the audio-content format for output by the first device, the sixth media content comprising a confirmation that the request to acquire the item has been received.

6. The method as recited in claim 1, wherein identifying the first media content further comprises:
comparing the first media content to metadata associated with broadcast content being currently input; and
identifying the first media content based at least in part on a result of comparing the first media content to the metadata.

7. The method as recited in claim 1, further comprising:
determining a browse history associated with the user; and
generating the third media content based at least in part on the browse history.

8. The method as recited in claim 1, wherein:
the second device is a mobile device; and
determining the second location further comprises determining the second location associated with the mobile device based at least in part on at least one of GPS coordinates or a triangulation associated with the mobile device.

9. The method as recited in claim 1, wherein:
the first user response is processed by performing speech recognition on the first user response to identify the first online purchase request,
the speech recognition on the first user response is performed via a natural language understanding (NLU) speech processing engine of the one or more remote computing systems;
the first user response is received from the first device as previous encoded digital media content, based at least in part on previous analog media content being generated by a microphone of the first device and converted to the previous encoded digital media content by one or more codecs of the first device;
performing the speech recognition on the first media content further comprises performing the speech recognition on the first media content via the NLU speech processing engine;
the first media content is received from the first device as encoded digital media content, based at least in part on analog media content being generated by the microphone of the first device and converted to the encoded digital media content by the one or more codecs of the first device; and
the NLU speech processing engine performs a text-to-speech (TTS) conversion on data used to generate the third media content in the audio-content format.

10. The method as recited in claim 1, further comprising:
obtaining log information identifying that:
a previous audio-content segment is transmitted to the first device, and previous video-content segments are transmitted the second device, and
in response to the previous audio-content segment, the first online purchase request is received prior to any online purchase requests being received in response to the previous video-content segments, wherein the first device is selected, from among the first device and the second device, to receive the third media content in the audio-content format, based at least in part on the log information.

11. The method as recited in claim 1, wherein the first device is selected to receive the third media content in the audio-content format, based at least in part on a larger number of item purchase requests being received in response to audio notification content segments than non-purchase related item information requests being received in response to video notification content segments.

12. The method as recited in claim 1, further comprising:
receiving, by at least one media content-based service provider server, at least one online account credential associated with the user; and
generating and processing, by the at least one media content-based service provider server and based at least in part on the at least one online account credential, a log query to identify the first format of the first previous media content and the second format of the second previous media content,
wherein, based at least in part on a result of the log query:
the first device is selected, by the at least one media content-based service provider server, and to receive the third media content in an audio-only format, and
the second device is selected, by the at least one media content-based service provider server, and to receive the fourth media content in a video-only format.

13. A system comprising:
one or more processors; and
one or more computer-readable media storing computer-executable instructions that, when executed by the one or more processors, cause the one or more processors to perform acts comprising:
performing speech recognition on first media content to identify an item referenced in the first media content;
determining a first location of a first device being a voice-controlled device;
determining a second location of a second device including a display;
determining that a first format of first previous media content to which a first user response was received is an audio-content format, the first user response received from the first device;
determining that a second format of second previous media content to which a second user response was received is a video-content format, the second user response received from the second device;
receiving second media content from the first device, based at least in part on sound associated with a program being output by a third device;
analyzing the second media content to identify the program;
selecting at least one of third media content or fourth media content to output based at least on part on the program and the item;
selecting, based at least in part on the first location, the determining that the first format of the first previous media content to which the first user response was received is the audio-content format, and the first user response including a first online purchase request associated with a first previous item identified by the first previous media content, the first device to receive the third media content in the audio-content format;
selecting, based at least in part on the second location, the determining that the second format of the second previous media content to which the second user response was received is the video-content format, and the second user response including a second online purchase request associated with a second previous item identified by the second previous media content, the second device to receive the fourth media content in the video-content format;
sending, to the first device and based at least in part on the selecting the first device, the third media content in the audio-content format;
sending, to the second device, and based at least in part on the selecting the second device, the fourth media content in the video-content format; and
receiving, from the first device, fifth media content including a request identifying the item.

14. The system as recited in claim 13,
wherein sending the third media content comprises sending the third media content with reference to a correlation between the first media content and a current location of a user,
wherein receiving the fifth media content including the request further comprises:
identifying a purchase history of the user; and
receiving the request during output of the third media content on the first device,
the acts further comprising:
instructing the first device to cease output of the third media content at least partly in response to receiving the request.

15. The system as recited in claim 13, the acts further comprising receiving another request for additional information regarding the third media content.

16. The system as recited in claim 13, the acts further comprising instructing the first device to alter output of the third media content at least partly in response to the third media content.

17. The system as recited in claim 13, wherein the fifth media content represents speech corresponding to a predefined phrase that includes the request to acquire the item, and receiving the fifth media content including the request further comprises receiving the request during output of the second media content on the first device,
further comprising:
instructing the first device to cease output of the second media content at least partly in response to recognizing the request.

18. A method comprising:
storing data indicative of activity of a user across client devices including a voice-controlled device configured to accept voice commands from the user;
receiving first media content identifying an item, based at least in part on the activity;
determining a first location of a first device being the voice-controlled device;
determining a second location of a second device being a mobile computing device that includes a display;
determining that a first format of first previous media content to which a first user response was received is an audio-content format, the first user response received from the first device;
determining that a second format of second previous media content to which a second user response was received is a video-content format, the second user response received from the second device;
receiving second media content from the first device, based at least in part on sound associated with a program being output by a third device;

analyzing the second media content to identify the program;

selecting at least one of third media content or fourth media content to output based at least on part on the program and the item;

selecting, by one or more remote computing systems, and based at least in part on the first location, the determining that the first format of the first previous media content to which the first user response was received is the audio-content format, and the first user response including a first online purchase request associated with a first previous item identified by the first previous media content, the first device to receive the third media content in the audio-content format;

selecting, by the one or more remote computing systems, and based at least in part on the second location, the determining that the second format of the second previous media content to which the second user response was received is the video-content format, and the second user response including a second online purchase request associated with a second previous item identified by the second previous media content, the second device to receive the fourth media content in the video-content format;

sending, to the first device and based at least in part on the selecting the first device, the third media content in the audio-content format;

sending, to the second device and based at least in part on the selecting the second device, the fourth media content in the video-content format;

receiving, from the first device, fifth media content in the audio-content format corresponding to a response to the third media content, the response including a first request received from the user;

performing speech recognition on the fifth media content to identify the item being referenced in the first request; and sending a second request to the first device, the second request comprising a request to authorize acquisition of the item.

19. The method as recited in claim 18, further comprising generating at least a portion of the third media content based at least in part on the activity, a current location of the user, or a demographic of the user.

20. The method as recited in claim 18, wherein the fourth media content is selected based at least in part on at least one of a schedule associated with the user received from the second device, or a to-do list received from the first device.

21. The method as recited in claim 18, wherein identifying the first request further comprises:
performing, via a natural language understanding (NLU) speech processing engine of the one or more remote computing systems, speech recognition on the third media content;
comparing the fifth media content to metadata associated with broadcast content being currently input; and
identifying the first request based at least in part on a result of comparing the fifth media content to the metadata.

22. The method as recited in claim 18, wherein individual ones of the one or more remote computing systems are corresponding servers, further comprising:
determining, by the one or more servers, an audio-only format of the third media content to be sent to the first device;
selecting, by the one or more servers and based at least in part on the audio-only format, the first device to receive the third media content;
determining, by the one or more servers, a video-only format of the fourth media content to be sent to the second device; and
selecting, by the one or more servers and based at least in part on the video-only format, the second device to receive the fourth media content.

* * * * *